United States Patent [19]

Tracy

[11] Patent Number: 4,824,287
[45] Date of Patent: Apr. 25, 1989

[54] SEPTIC SYSTEM

[76] Inventor: Lawrence M. Tracy, 241 Ball Pond Rd., New Fairfield, Conn. 06812

[21] Appl. No.: 157,938

[22] Filed: Feb. 19, 1988

[51] Int. Cl.⁴ .............................................. E02B 13/00
[52] U.S. Cl. ..................................... 405/36; 210/170; 210/532.2; 405/43; 405/46; 405/49
[58] Field of Search ...................... 405/16, 36, 43–50; 210/170, 532.2

[56] References Cited

U.S. PATENT DOCUMENTS

| | | | |
|---|---|---|---|
| 2,767,801 | 10/1956 | Eads | 405/36 X |
| 3,339,366 | 9/1967 | Gogan et al. | 405/36 |
| 3,426,903 | 2/1969 | Olecko | 210/532.2 X |
| 3,928,701 | 12/1975 | Roehner | 405/16 X |
| 3,962,088 | 6/1976 | Kuhlenschmidt et al. | 210/170 |
| 4,003,408 | 1/1977 | Turner | 405/43 X |
| 4,313,692 | 2/1982 | Johnson | 405/43 |
| 4,588,325 | 5/1986 | Seefert | 405/46 |
| 4,759,661 | 7/1988 | Nicholas et al. | 405/48 |

OTHER PUBLICATIONS

Technical Support Paper for Randy May, The Infiltrator Leaching System, 4/87 with Product brochure.

Primary Examiner—David H. Corbin
Attorney, Agent, or Firm—Mattern, Ware, Stoltz & Fressola

[57] ABSTRACT

In a septic system for handling household waste water, used vehicle tires are employed to form the septic tank and the leaching galleries. Vehicle tires sealed to one another and in combination with end caps provide a watertight and lighttight enclosure in the septic tank. An inlet conduit permits the influx of sewage into the enclosure while an outlet conduit allows egress of effluent from the enclosure via hydrostatic pressure. The drain field used with the system and also useful for other purpose has tires axially aligned forming an array with each tire defining an interior hollow chamber. A delivery conduit leading from the outlet conduit of the septic tank introduces effluent into the hollow chambers of the vehicle tires where it is allowed to seep therefrom into the surrounding earth through apertures in the walls of the tires. The tires in the drain field can be horizontally aligned or can be in a vertical stacking arrangement similar to the arrangement found in the septic tank.

53 Claims, 4 Drawing Sheets

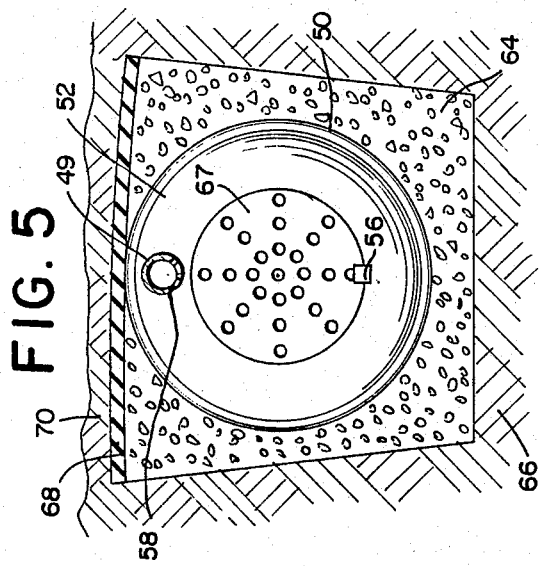
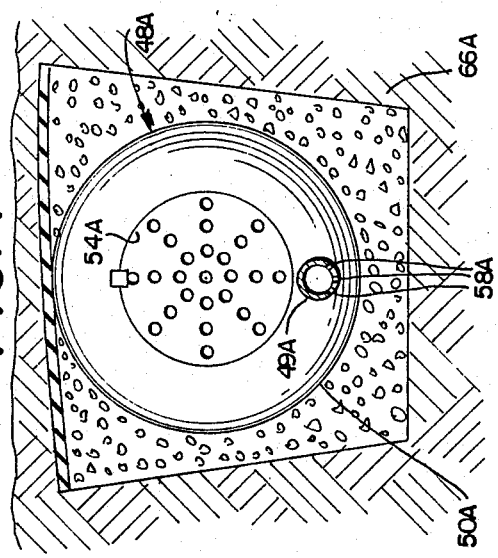
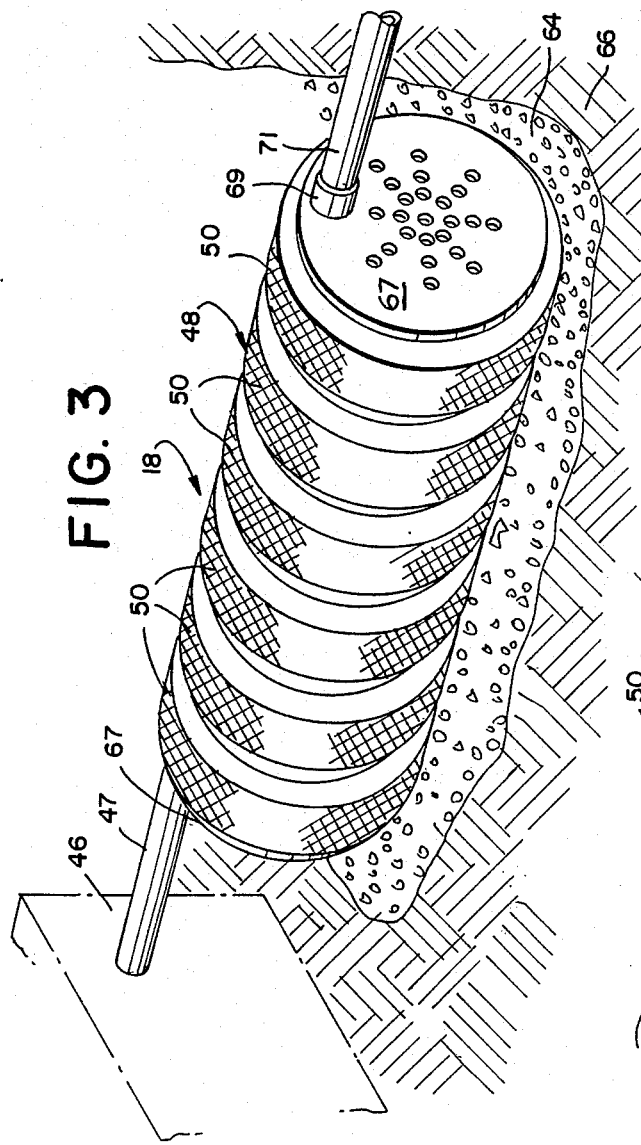
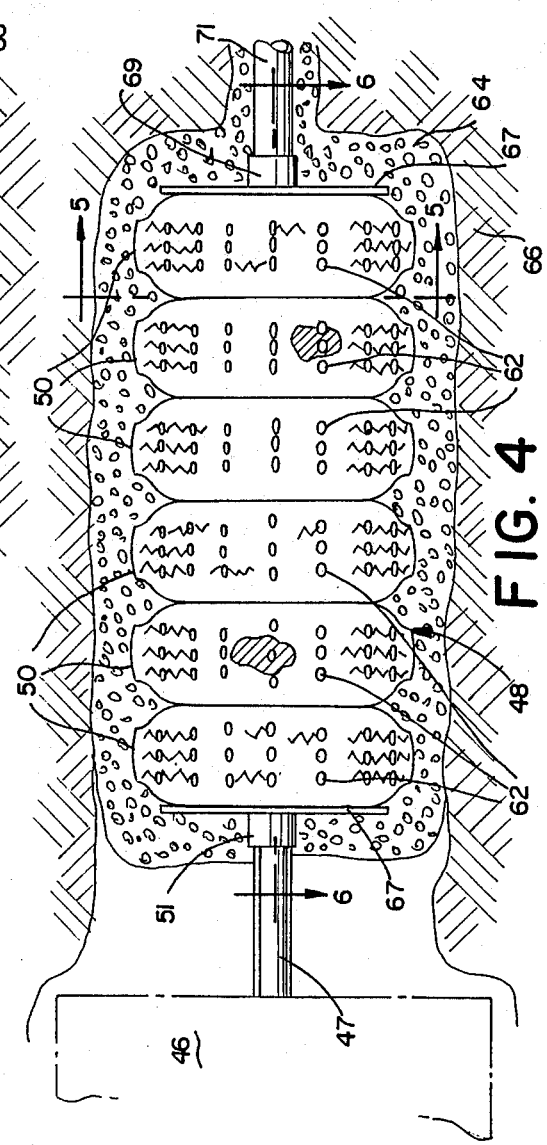

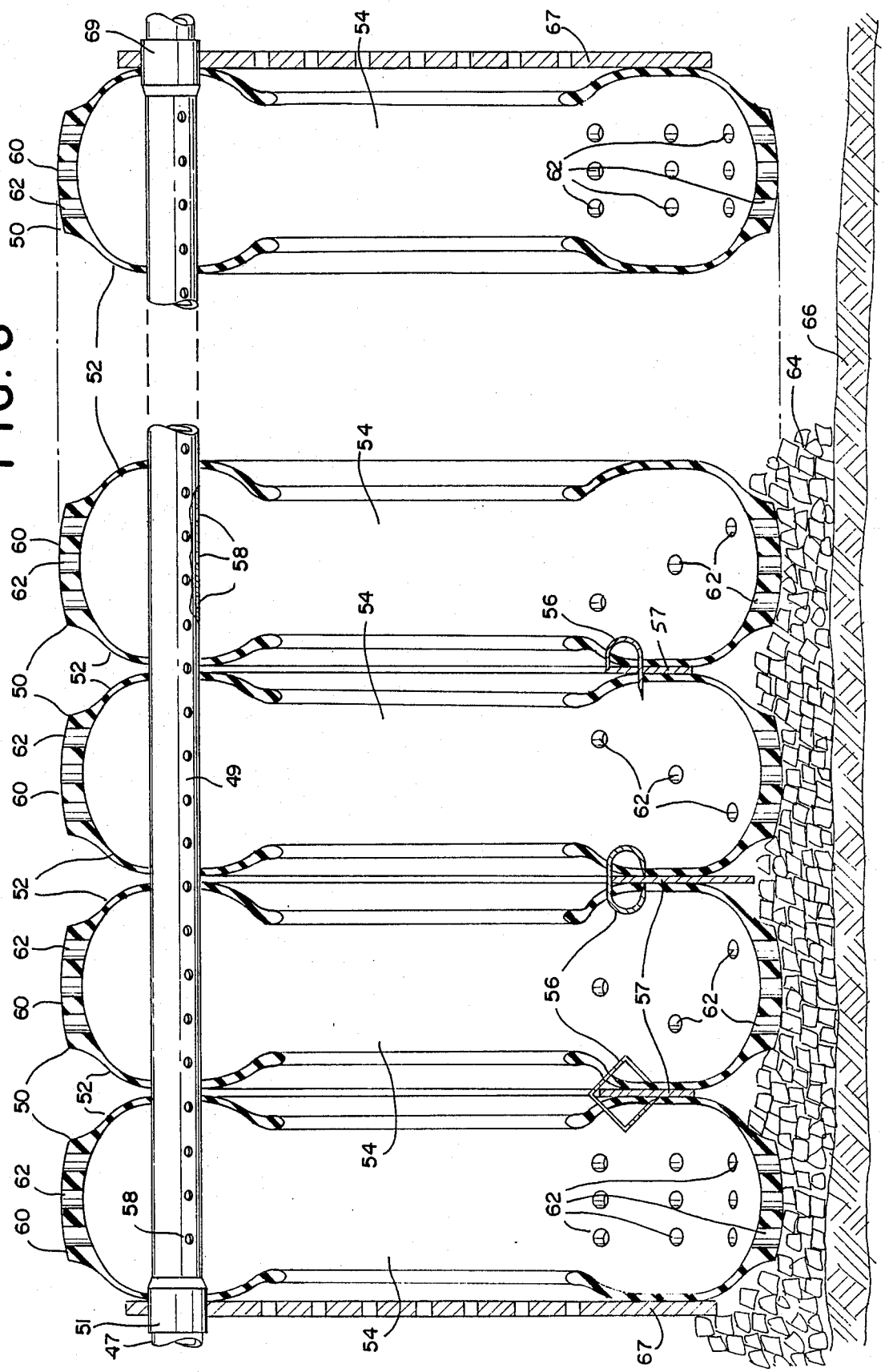

SEPTIC SYSTEM

BACKGROUND OF THE INVENTION

The present invention relates generally to septic systems, and more particularly to a septic system which uses discarded vehicle tires to form the septic tank and leaching fields.

In terms of volume, most of the water used in households around the United States is employed to carry off wastes, most of these wastes being organic and inorganic solids. Larger volumes of water are used for washing dishes, bathing and flushing the toilet than for drinking, cooking, washing cars, etc.

In urban areas, wastes carried by water from kitchens, bathrooms and laundry rooms are collected in a sewer system and transported to central sewage treatment plants. In rural areas and in unsewered suburban residential areas, individual septic systems are used to treat household waste. There are millions of such septic systems presently in use and being built in the United States. If properly designed, installed and adequately maintained, such a septic system will serve a household satisfactorily to treat household wastes.

In use, a septic system will condition household water carrying dirt, detergents, discarded food scraps and body wastes so that water may be readily percolated into the sub-soil of the surrounding ground. A typical septic system is comprised of a rectangular precast cement septic tank buried in the ground having a leaching or drain field extending therefrom. Household wastes or sewage flows to the septic tank under the influence of gravity from the house via a sewer line or pipe. The septic tank is a large, watertight and lighttight container in which the organic solids found in the sewage are decomposed by natural bacterial processes. Once the sewage is introduced into the tank, large solid particles sink forming a sludge at the bottom of the tank while smaller, lighter particles as well as oils and greases rise to the surface forming a scum layer over a volume of liquid material located between the sludge and scum layers. Bacteria and other organisms in the tank break down and reduce the volume of the solids and scum. The bacteria cannot attack some of the material introduced into the system such as stone particles, plastic, etc. and these materials must be removed from the tank during periodic tank cleanings.

An outlet pipe is provided in the tank permitting some of the liquid material known as effluent to flow via hydrostatic pressure from the tank. The effluent still contains some decomposed solids as well as bacteria, viruses, etc. found in the tank and flows into an adjoining leaching or drain field where it must be permitted to percolate through the surrounding ground.

The leaching field has traditionally been a trench in the ground about eighteen inches (18") wide filled with gravel. A four inch (4") perforated pipe is located in the trench surrounded by the gravel. Laid over the gravel and the pipe is a layer of tar paper, salt hay or woven plastic cloth with layer of top soil placed thereover. The pipe is set at an appropriate pitch to permit a desired flow of the effluent therealong under the influence of gravity. In use, the effluent runs down the perforated pipe from one end of the pipe to the other and flows out the apertures therein into the surrounding gravel and eventually into the surrounding ground.

Another type of leaching field is formed of precast concrete galleries which create space underground within a gravel bed to increase the volume of the field. These galleries are made in different shapes (rectangular, triangular) and are ideal for situations where there is insufficient area for the traditional pipe and gravel systems.

Some of the drawbacks of the traditional septic systems are that the septic tanks and leaching galleries have been made from precast concrete and are extremely heavy requiring heavy construction equipment to put them in place. In the leaching fields, the gravel used in constructing them is difficult to work with and expensive. It also tends to settle and reduces the overall volume of the trench by as much as seventy five percent (75%).

The present invention is designed to overcome the limitations that are attendant upon the use of traditional septic systems, and toward this end, it contemplates the provision of a novel septic system which can be assembled off-site and easily transported to the installation location.

It is an object of the invention to provide a septic system which employs used vehicle tires to form the septic tank and drain field. Such tires are readily available with tire retail sales outlets, automobile repair garages, etc. willing to pay for removing them.

It is also an object to provide such a system which is relatively light weight compared to precast concrete systems.

A further object is to provide such a system which may be readily and economically fabricated and will enjoy a long life in operation.

SUMMARY OF THE INVENTION

It has now been found that the foregoing and related objects can be readily attained in a septic system having a septic tank in which household wastes are treated. Solid wastes are decomposed by natural bacterial processes and settle in the tank while effluent flows from the tank into an adjoining field. The septic tank includes a plurality of vehicle tires forming a vertical stack of tires. The vertical stack of tires is sealed to form a watertight and lighttight enclosure therewithin. An inlet conduit adapted to be connected to a sewage line extends through at least one of the tires thereby permitting influx of household wastes into the enclosure. An outlet conduit extends through at least one of the tires for permitting egress of effluent from the enclosure to the adjoining drain field. The inlet and outlet conduits are oriented in such a manner that hydrostatic pressure forces effluent in the tank through the outlet conduit when household wastes are introduced through the inlet conduit.

The adjoining drain field permits effluent from the tank to seep into adjoining ground. The drain field comprises an array of vehicle tires in axial alignment, a delivery conduit in the form of a perforated pipe operatively connected to the array of tires for introducing effluent from a septic tank into hollow chambers within the tires, and apertures defined in the tires which permit the effluent introduced by the delivery conduit into the hollow chambers of tires to seep into adjoining ground.

Desirably, upper and lower end covers for the septic tank are provided and sealed to the lowermost and uppermost vehicle tires, respectively, in the vertical stack of vehicle tires. The upper end cover is provided with an access opening permitting access into the enclosure and includes a removable cover thereover for sealing the same. A sealant is used to bond the plurality of vehicle tires in the vertical stack of tires to one another thereby sealing any gaps and openings therebetween.

In the preferred embodiment of the leaching or drain field, the delivery conduit runs generally parallel to the axis of the array of tires and extends through side walls thereof. In another embodiment, the array of tires is a vertical stack of tires with the delivery conduit running generally normal to the axis of the array of tires. The delivery conduit extends through a tread wall of the uppermost tire in the array while an upper end cover is positioned over the upper end thereof. In a modified form of the drain field, the array of vehicle tires is comprised of vehicle tires which have been cut in half with the delivery conduit running generally parallel to the axis of the array of half tires and extending through side walls thereof. The drain galleries of the present invention are underground in a trench with gravel at least partially surrounding the galleries. The hollow chambers of the array of tires define an open space within the trench.

The invention will be more fully understood when reference is made to the following detailed description taken in conjunction with the accompanying drawings.

BRIEF DESCRIPTION OF THE DRAWINGS

FIG. 3 is a perspective view of a portion of the leaching field of the present invention with the surrounding dirt and gravel broken away to illustrate internal gallery structure;

FIG. 4 is a top view of the structure of FIG. 3;

FIG. 5 is a cross sectional view taken along the 5—5 line of FIG. 4;

FIG. 6 is a cross sectional view taken along the 6—6 line of FIG. 4 and illustrating various ways used to fasten the tires together;

FIG. 7 is a cross sectional view similar to the view in FIG. 5, however, showing a modified form of the present invention with the perforated delivery conduit running in the lower portions of the tires rather than in the upper portions thereof;

DETAILED DESCRIPTION OF THE PREFERRED EMBODIMENTS

Figure 1:
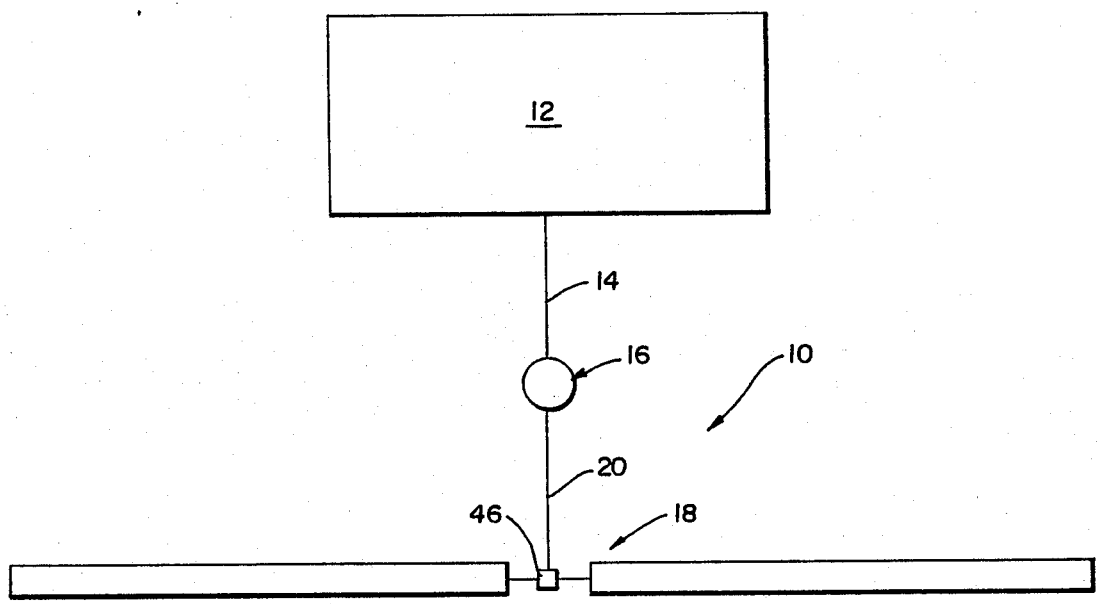
FIG. 1 is a schematic illustration of a septic system embodying the present invention.

Referring first to FIG. 1, therein is illustrated a septic system generally indicated by the numeral 10 for processing wastes produced in the household 12. Household wastes travel from the house 12 along a sewage line or pipe 14 by gravity induced flow to an underground septic tank generally indicated by the numeral 16. The septic tank 16 is in turn connected to an underground leaching or drain field generally indicated by numeral 18 through effluent line or pipe 20.

Figure 2:
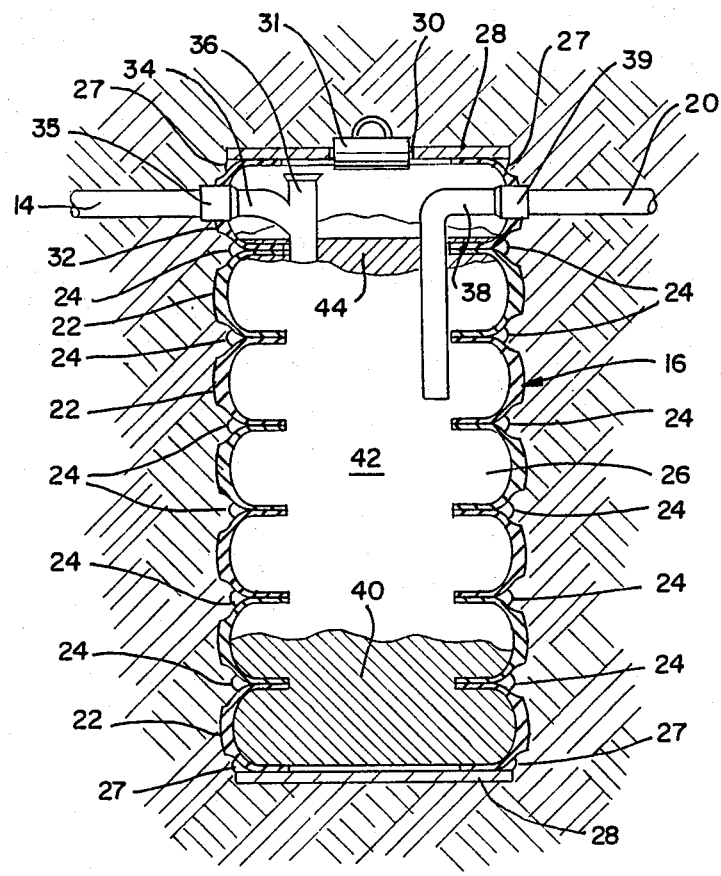
FIG. 2 is a cross sectional view of the septic tank of the present invention.

Turning now to FIG. 2, therein is illustrated in detail the septic tank 16 made in accordance with the present invention in which household wastes are treated. The main body of the tank 16 is a vertical stack of used vehicle tires indicated by numeral 22. While such tires generally come in different sizes, the tires 22 in such a stack should be matched so that they are all of the same internal and external diameters; however, the tires varying in both internal and external diameters can be used satisfactorily in the same stack. As shown, the tires 22 are in abutting relationship and are axially aligned in the stack to form a stable column. In order to make the stack watertight and lighttight, the areas between the abutting tires 22 are filled with a suitable chemical sealing compound or cement, thereby creating leak proof seals 24 between the tires 22 to define an enclosure 26. The entire structure could also be deposited in a polyethylene skin to prevent seepage from the enclosure 26. In addition, positioned on the uppermost and lowermost tires 22 are suitable end covers 28 formed from ¼ inch steel plate. The steel plate end covers 28 are also sealed to the stack of tires with a suitable chemical sealing compound as indicated by numeral 27. The upper end cover 28 has an access opening 30 for permitting periodic inspection and cleaning of the septic tank 16. The access opening 30 is provided with a suitable cover 31 for maintaining the watertight and lighttight status of the enclosure 26 of the septic tank 16.

Extending into the enclosure 26 through the tread wall 32 of the uppermost tire 22 is an inlet conduit 34 which is connected via connector 35 to the sewage line 14 from the household being serviced. The connector 35 is sealed to tread wall 32. The inlet conduit 34 is sealed to the tread wall 32 and is preferably a four inch (4") or larger polyvinylchloride pipe with a T-connection 36 at the end thereof. As known in the art, the top of the T-connection is located approximately one inch (1") below the upper end cover 28 and permits gas produced through the bacterial action within the tank to escape via the sewer pipe 14. Diametrically opposed to the inlet conduit 34 at the same level thereof is an outlet conduit 38 which is in the form of a polyvinylchloride elbow positioned in connector 39 which is sealed to the tread wall 32 of the uppermost tire 22. It should be appreciated that the outlet conduit 38 extends into the liquid located in the tank to a greater depth than that of the inlet conduit 34. Household wastes delivered into the tank 16 through the inlet conduit 34 separate into three distinct layers: sludge layer 40 located at the bottom of the tank 16, effluent layer 42 located in the middle portion of the tank 16 and a light weight scum layer 44 located at the upper portion of the tank 16. As the household wastes are introduced into the tank 16, hydrostatic pressure forces therewithin advance the effluent 42 located at the middle portion of the tank 16 through the outlet conduit 38 and into the effluent pipe 20 to the adjoining leaching or drain field 18 (FIG. 1).

Referring now to FIGS. 3 through 6, the first embodiment of the leaching or drain field 18 of the present invention can be more clearly understood. The effluent coming out of the septic tank 16 is delivered to an underground distribution box or chamber 46 from which it can flow into the two branches of the leaching field 18.

The distribution box 46 is made of precast concrete and is large enough to accommodate all pipe ends entering and leaving it. It is contemplated that the distribution box 46 could be designed to be made of tires in a manner similar to the previously described septic tank 16. The effluent moves from the distribution box 46 along distribution conduits 47, preferably polyvinylchloride pipe, to leaching galleries generally indicated by numeral 48. These galleries include a plurality of vehicle tires 50. The side wall 52 of each of the vehicle tires 50 is punched in an upper portion thereof with an appropriate sized hole to receive a perforated delivery conduit 49 which passes therethrough and runs generally parallel to the axis of the array of tires 50. The delivery conduit 49 is connected to the distribution conduit 47 by connector 51. The vehicle tires 50 are in axial alignment with each of the tires 50 defining an interior hollow chamber 54 (FIG. 6).

As seen in FIG. 6, the tires 50 in the array are mechanically fastened to one another using any one of a variety of mechanical fastening elements 56. In this instance, several different styles of staples are shown as the mechanical fasteners. Spacers or support elements 57 can be placed between the tires 50 to strengthen the areas through which the mechanical fasteners pass. As also seen in FIG. 6, the delivery conduit 49 is provided with a plurality of perforations 58 therealong through which the effluent flows out into the hollow chambers 54 formed by the tires 50. The tread walls 60 of the tires 50 are provided with apertures 62 for permitting effluent introduced by the delivery conduit 49 into the hollow chambers 54 of the tires 50 to seep into the adjoining earth 66 through the gravel bed 64 surrounding the tires. The apertures 62 can be punched randomly in the tread walls 60. Several different aperture patterns are shown in FIG. 6. When steel belted tires are used, it is preferable to punch the apertures 62 through the exposed portions of sidewalls 52 of the tires to prevent rust formation on the steel belts. Each end of the array of tires 50 is provided with a perforated end cover 67 which prevents the gravel 64 and adjoining earth 66 from flowing into the hollow chambers 54 of the tires 50. A connector 69 extends through the end cover 67 and interconnects the delivery conduit 49 to a second distribution conduit 71 which leads to additional leaching galleries (not shown).

In constructing the leaching or drain field 18, a trench is dug by a backhoe and a small amount of gravel 64 is placed on the bottom of the trench. The leaching galleries 48 which have been preassembled in an off-site location, are lowered into the trench and the delivery conduit 49 set at the proper pitch (approximately two to four inches (2"–4") per hundred foot (100') length) to achieve the desired effluent flow. Thereinafter, more gravel 64 is added to the trench and, finally, the entire structure is covered by a layer of tar paper, salt hay, or woven plastic cloth 68 and topsoil 70 (FIG. 5). Any number of tires can be used to form a gallery and the galleries can be set up in series or parallel arrangement. The purpose of the galleries is to provide additional volume to the leaching field without using concrete forms or large amounts of heavy, expensive, hard-to-work-with gravel.

In FIG. 7, there is illustrated a modified form of the drain field system of the present invention in which the leaching gallery 48A is set in the trench so the delivery conduit 49A is in the lower portion of the tires 50A rather than the upper portion as in the first embodiment. The perforations 58A in the conduit 49A are placed to facilitate flow of effluent to the hollow chambers 54A and, ultimately, through the apertures 62A in to the surrounding gravel 64A and ground 66A.

Figure 9:
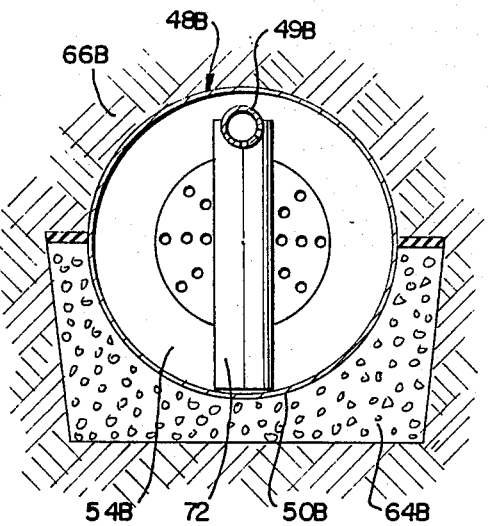
FIG. 9 is a cross sectional view taken along the 9—9 line of FIG. 8.
Figure 8:
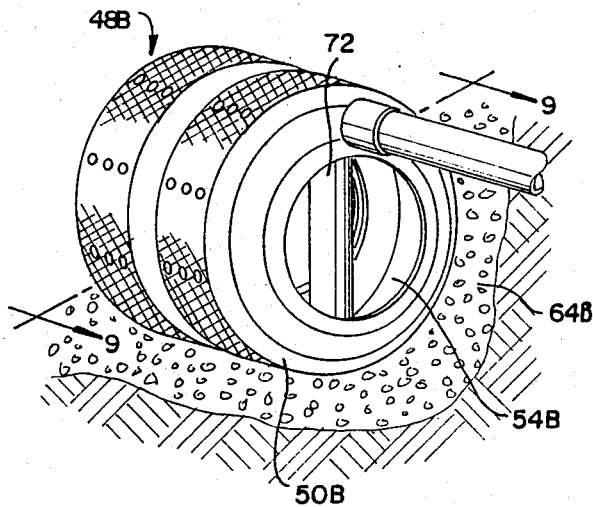
FIG. 8 is a partial perspective view of a modified form of the leaching field of the present invention with portions broken away and removed to show a stanchion mounted within at least one of the tires for supporting the perforated delivery conduit.

Yet another modified form of the leaching gallery of the present invention is shown in FIGS. 8 and 9 and generally indicated by numeral 48B. A stanchion 72 is inserted within the hollow chamber 54B of at least one of the tires 50B and notched at the upper end thereof to accept the delivery conduit 49B. The stanchion 72 can be made of standard six inch (6") polyvinylchloride pipe and provides extra support for the perforated delivery conduit 49B thereby stabilizing the entire leaching field system. When such stanchions are utilized in a gallery, the gravel 64B as shown need not surround the entire gallery but can be at least partially supported by the ground 66B.

Figure 10:
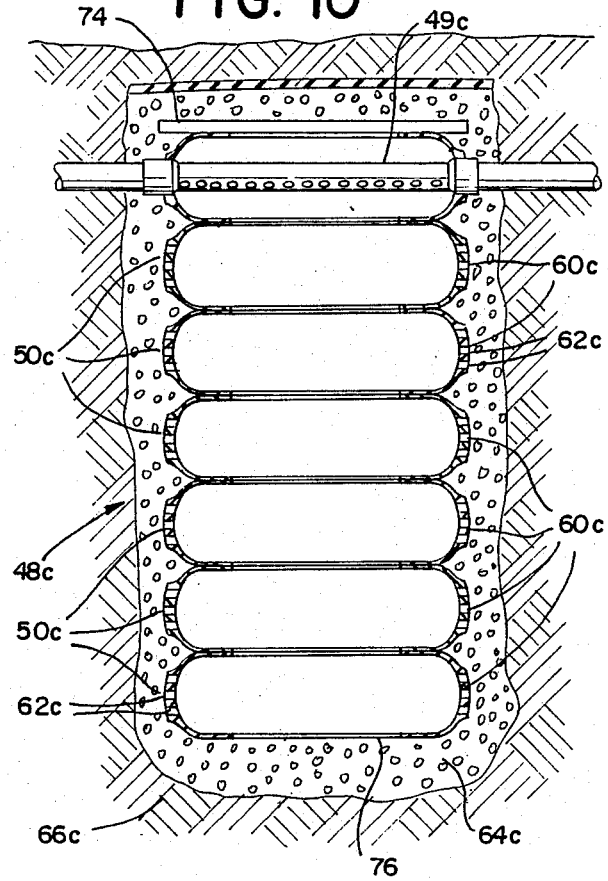
FIG. 10 is a cross sectional view of another embodiment of the leaching field of the present invention in which the stack of tires is vertical in orientation rather than horizontal.

Another embodiment of the leaching gallery 48C is shown in FIG. 10. This embodiment is similar to the septic tank structure previously described as it is in the form of a vertical stack of used vehicle tires 50C; however, it should be appreciated that the tread walls 60C of these tires 50C are provide with apertures 62C allowing effluent delivered by the perforated delivery conduit 49C to flow therethrough and into the surrounding gravel 64C and ground 66C. It should be apparent that it is unnecessary to seal the abutting tires 50C to one another as gaps and openings therebetween provide further escape paths for the effluent. The upper portion of the stack is provided with a cover 74 but unlike the septic system 16 the lowermost tire is left open so that effluent can flow through opening 76 to be absorbed by the gravel bed 64C. The FIG. 10 gallery embodiment can also be connected in series or parallel to other galleries.

Figure 11:
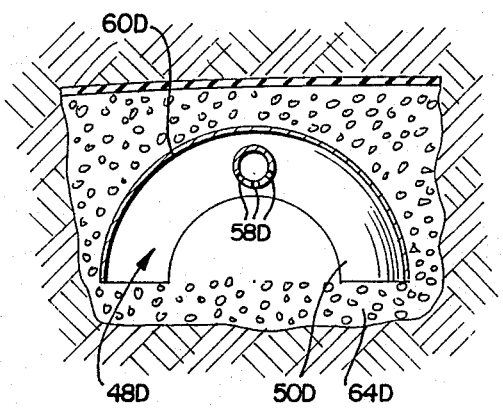
FIG. 11 is a cross sectional view of the final embodiment of the leaching field of the present invention which is similar to the first embodiment but the vehicle tires have been cut in half to form a series of archways thereby conserving space.

The final leaching gallery embodiment, generally indicated by the numeral 48D, is shown in FIG. 11 and is similar to the FIG. 3 embodiment; however, all of the tires 50D therein have been cut in half so that they form an archway type structure and do not take up as much space as the full tire embodiment of FIG. 3. The perforated delivery conduit 49D has perforations 58D through which effluent flows. It is unnecessary to have apertures in the tread walls 60D as the effluent drips directly from conduit 49D to the gravel 64D. This particular embodiment useful in situations where the surrounding area has a high water table.

Thus, it can be seen from the foregoing specification and attached drawings that the septic system of the present invention provides an effective means for conditioning household wastes and takes advantage of the huge supply of old unwanted used tires. The tires used in the present system do not readily decay and, therefore, will function adequately for a very long period of time.

The preferred embodiments admirably achieve the objects of the present invention; however, it should be appreciated that departures can be made by those skilled in the art without departing from the spirit and scope of the invention which is limited only by the following claims.

Having thus described the invention, what is claimed is:

1. In a septic system,
   A. a septic tank in which household wastes are treated, with solid wastes being decomposed by natural bacterial processes and settling in the tank while effluent flows from the tank into an adjoining drain field, comprising:
  i. a plurality of vehicle tires forming a vertical stack of tires;
  ii. means sealing said vertical stack of tires to form a watertight and lighttight enclosure therewithin;
  iii. an inlet conduit in at least one of said plurality of tires for permitting influx of household wastes into said enclosure; said inlet conduit adapted to be connected to a sewage line; and
  iv. an outlet conduit in at least one of said plurality of tires for permitting egress of effluent from said enclosure, said outlet conduit connected to a pipe leading to a drain field; and
B. a drain field permitting effluent from said septic tank to seep into adjoining ground, comprising:
  i. an array of vehicle tires in axial alignment, each of said vehicle tires in said array defining an interior hollow chamber;
  ii. delivery means operatively connected to said array of tires for introducing effluent from a septic tank into said hollow chambers of said tires; and
  iii. means permitting effluent introduced by said delivery means into said hollow chambers of said tires to seep into adjoining ground.

2. A septic system in accordance with claim 1 wherein said sealing means includes upper and lower end covers sealed to the lowermost and uppermost vehicle tires, respectively, in said vertical stack of vehicle tires.

3. A septic system in accordance with claim 2 wherein said upper end cover is provided with an access opening permitting access into said enclosure.

4. A septic system in accordance with claim 3 wherein said access opening has a removable cover thereover for sealing the same.

5. A septic system in accordance with claim 2 wherein said sealing means includes a sealant bonding said plurality of vehicle tires in said vertical stack of tires to one another and sealing any gaps and openings therebetween.

6. A septic system in accordance with claim 1 wherein said sealing means includes a sealant bonding said plurality of vehicle tires in said vertical stack of tires to one another and sealing any gaps and openings therebetween.

7. A septic system in accordance with claim 1 wherein said inlet and outlet conduits are oriented in such a manner that hydrostatic pressure forces effluent through said outlet conduit when household wastes are introduced through said inlet conduit.

8. A septic system in accordance with claim 1 wherein said array of tires are held together by mechanical means.

9. A septic system in accordance with claim 8 wherein said mechanical means are staples inserted through side walls of the tires.

10. A septic system in accordance with claim 1 wherein said delivery means is a delivery conduit running generally parallel to the axis of said array of tires.

11. A septic system in accordance with claim 10 wherein said delivery conduit extends through side walls of said tires in said array.

12. A septic system in accordance with claim 1 wherein said delivery means is a pipe having apertures therein providing means for egress for effluent into said hollow chambers of said array of tires.

13. A septic system in accordance with claim 1 wherein said array of tires is a vertical stack of tires.

14. A septic system in accordance with claim 13 wherein said delivery means is a delivery conduit running generally normal to the axis of said array of tires.

15. A septic system in accordance with claim 14 wherein said delivery conduit extends through a tread wall of one of said array of tires in said array.

16. A septic system in accordance with claim 15 wherein said one array of said tires in said array is the uppermost tire.

17. A septic system in accordance with claim 13 wherein said array of tires is at least partially surrounded by gravel.

18. A septic system in accordance with claim 13 further including an upper end cover positioned over the upper end of said array of tires.

19. A septic system in accordance with claim 1 wherein said array of vehicle tires is comprised of vehicle tires which have been cut in half.

20. A septic system in accordance with claim 19 wherein said delivery means is a delivery conduit running generally parallel to the axis of said array of half tires.

21. A septic system in accordance with claim 20 wherein said delivery conduit extends through side walls of said tires.

22. A septic system in accordance with claim 1 further including a trench in which said array of vehicle tires, delivery means and effluent seeping means are positioned.

23. A septic system in accordance with claim 22 further including gravel in said trench at least partially surrounding said array of vehicle tires, delivery means and effluent seeping means.

24. A septic system in accordance with claim 23 wherein said hollow chambers of said array of tires defines an open space within said trench.

25. A septic system in accordance with claim 1 wherein said effluent seeping means comprises apertures defined in said vehicle tires of said array which permit egress of said effluent from said hollow chambers.

26. A septic system in accordance with claim 25 wherein said apertures are in tread walls of said vehicle tires of said array.

27. A septic tank in which household wastes are treated, with solid wastes being decomposed by natural bacterial processes and settling in the tank while effluent flows from the tank into an adjoining drain field, comprising:
A. a plurality of vehicle tires forming a vertical stack of tires;
B. means sealing said vertical stack of tires to form a watertight and lighttight enclosure therewithin;
C. an inlet conduit in at least one of said plurality of tires for permitting influx of household wastes into said enclosure; said inlet conduit adapted to be connected to a sewage line; and
D. an outlet conduit in at least one of said plurality of tires for permitting egress of effluent from said enclosure, said outlet conduit adapted to be connected to a pipe leading to a drain field.

28. A septic tank in accordance with claim 27 wherein said sealing means includes upper and lower end covers sealed to the lowermost and uppermost vehicle tires, respectively, in said vertical stack of vehicle tires.

29. A septic tank in accordance with claim 28 wherein said upper end cover is provided with an access opening permitting access into said enclosure.

30. A septic tank in accordance with claim 29 wherein said access opening has a removable cover thereover for sealing the same.

31. A septic tank in accordance with claim 30 wherein said sealing means includes a sealant bonding said plurality of vehicle tires in said vertical stack of tires to one another and sealing any gaps and openings therebetween.

32. A septic tank in accordance with claim 27 wherein said sealing means includes a sealant bonding said plurality of vehicle tires in said vertical stack of tires to one another and sealing any gaps and openings therebetween.

33. A septic tank in accordance with claim 27 wherein said inlet and outlet conduits are oriented in such a manner that hydrostatic pressure forces effluent through said outlet conduit when household wastes are introduced through said inlet conduit.

34. A drain field system for guiding effluent through a drain field and permitting effluent to seep into adjoining ground comprising:
   A. an array of vehicle tires in axial alignment, each of said vehicle tires in said array defining an interior hollow chamber;
   B. delivery means operatively connected to said array of tires for introducing effluent into said hollow chambers of said tires; and
   C. means permitting effluent introduced by said delivery means into said hollow chambers of said tires to seep into adjoining ground.

35. A drain field system in accordance with claim 34 wherein said array of tires are held together by mechanical means.

36. A drain field system in accordance with claim 36 wherein said mechanical means are staples inserted through side walls of the tires.

37. A drain field system in accordance with claim 34 wherein said delivery means is a delivery conduit running generally parallel to the axis of said array of tires.

38. A drain field system in accordance with claim 37 wherein said delivery conduit extends through side walls of said tires in said array.

39. A drain field system in accordance with claim 34 wherein said delivery conduit is a pipe having apertures therein providing means for egress for effluent into said hollow chambers of said array of tires.

40. A drain field system in accordance with claim 34 wherein said array of tires is a vertical stack of tires.

41. A drain field system in accordance with claim 40 wherein said delivery means is a delivery conduit running generally normal to the axis of said array of tires.

42. A drain field system in accordance with claim 41 wherein said delivery conduit extends through a tread wall of one of said tires in said array.

43. A drain field system in accordance with claim 42 wherein said one of said tires in said array is the uppermost tire.

44. A drain field system in accordance with claim 40 wherein said array of tires is at least partially surrounded by gravel.

45. A drain field system in accordance with claim 40 further including an upper end cover positioned over the upper end of said array of tires.

46. A drain field system in accordance with claim 34 wherein said array of vehicle tires is comprised of vehicle tires which have been cut in half.

47. A drain field system in accordance with claim 46 wherein said delivery means is a delivery conduit running generally parallel to the axis of said array of half tires.

48. A drain field system in accordance with claim 47 wherein said delivery conduit extends through side walls of said tires.

49. A drain field system in accordance with claim 34 further including a trench in which said array of vehicle tires, delivery means and effluent seeping means are positioned.

50. A drain field system in accordance with claim 49 further including gravel in said trench at least partially surrounding said array of vehicle tires, delivery means and effluent seeping means.

51. A drain field system in accordance with claim 50 wherein said array of tires defines an open space within said hollow chambers of said trench.

52. A drain field system in accordance with claim 34 wherein said effluent seeping means comprises apertures defined in said vehicle tires of said array which permit egress of said effluent from said hollow chambers.

53. A drain field system in accordance with claim 52 wherein said apertures are in tread walls of said vehicle tires of said array.

* * * * *